United States Patent
Liu et al.

(10) Patent No.: US 12,536,726 B2
(45) Date of Patent: Jan. 27, 2026

(54) SYSTEMS AND METHODS FOR ENHANCING OBJECTS IN X-RAY IMAGES

(71) Applicant: Shanghai United Imaging Intelligence Co., Ltd., Shanghai (CN)

(72) Inventors: Yikang Liu, Cambridge, MA (US); Zhang Chen, Brookline, MA (US); Xiao Chen, Lexington, MA (US); Shanhui Sun, Lexington, MA (US)

(73) Assignee: Shanghai United Imaging Intelligence Co., Ltd., Shanghai (CN)

(*) Notice: Subject to any disclaimer, the term of this patent is extended or adjusted under 35 U.S.C. 154(b) by 263 days.

(21) Appl. No.: 18/531,379

(22) Filed: Dec. 6, 2023

(65) Prior Publication Data
US 2025/0191260 A1    Jun. 12, 2025

(51) Int. Cl.
*G06T 11/60*    (2006.01)
*G06T 5/50*    (2006.01)
*G06T 7/30*    (2017.01)
*G06T 7/70*    (2017.01)

(52) U.S. Cl.
CPC .............. *G06T 11/60* (2013.01); *G06T 5/50* (2013.01); *G06T 7/30* (2017.01); *G06T 7/70* (2017.01); *G06T 2207/10116* (2013.01); *G06T 2207/20216* (2013.01); *G06T 2207/20224* (2013.01); *G06V 2201/07* (2022.01)

(58) Field of Classification Search
CPC ... G06T 11/60; G06T 7/30; G06T 5/50; G06T 2207/10116; G06T 2207/20216; G06T 2207/20224; G06V 2201/07
See application file for complete search history.

(56) References Cited

U.S. PATENT DOCUMENTS

| | | | |
|---|---|---|---|
| 9,082,158 | B2 | 7/2015 | Chen et al. |
| 9,084,531 | B2 | 7/2015 | Chen et al. |
| 9,119,573 | B2 | 9/2015 | Lu et al. |
| 9,855,384 | B2 | 1/2018 | Cohen et al. |

(Continued)

OTHER PUBLICATIONS

Chen, Bor-Jeng, "Guidewire tracking using a novel sequential segment optimization method in interventional X-ray videos," Jun. 2016, 2016 IEEE 13th International Symposium on Biomedical Imaging (ISBI), pp. 103-106 (Year: 2016).*

(Continued)

*Primary Examiner* — Terrell M Robinson
(74) *Attorney, Agent, or Firm* — Zhong Law, LLC (57) ABSTRACT

In some embodiments, a method for enhancing objects in an X-ray video may include receiving an image frame in an X-ray video and detecting, using a first machine learning model, one or more objects in the image frame, wherein the detection is performed based on the image frame, a sequence of image frames preceding the image frame in the X-ray video, and data indicating one or more objects in the sequence of image frames. The method may further include determining, using a second machine learning model, a background image layer, based on the image frame and one or more image frames from the sequence of image frames that precedes the image frame in the X-ray video. The method may further generate an output image containing an enhanced view of the one or more objects in the image frame based in part on the background image layer.

20 Claims, 8 Drawing Sheets

(56) References Cited

U.S. PATENT DOCUMENTS

| | | | |
|---|---|---|---|
| 9,974,509 B2 | 5/2018 | Steinberg et al. | |
| 2018/0165548 A1* | 6/2018 | Wang | G06N 3/09 |
| 2020/0380671 A1* | 12/2020 | Zuo | G06F 18/24 |
| 2023/0169659 A1* | 6/2023 | Chen | G06T 7/11 |
| | | | 382/131 |
| 2023/0206429 A1* | 6/2023 | Liu | G06V 10/82 |
| | | | 382/132 |
| 2024/0013510 A1* | 1/2024 | Liu | G06V 10/751 |

OTHER PUBLICATIONS

Habijan, Marija, "Centerline Tracking of the Single Coronary Artery from X-ray Angiograms," Oct. 2020, International Symposium ELMAR, pp. 117-121 (Year: 2020).*

Salahuddin, Zohaib, "Multi-Resolution 3D Convolutional Neural Networks for Automatic Coronary Centerline Extraction in Cardiac CT Angiography Scans," May 2021, 2021 IEEE 18th International Symposium on Biomedical Imaging (ISBI), pp. 91-95, (Year: 2021).*

Robust Landmark-based Stent Tracking in X-ray Fluoroscopy.

* cited by examiner

SYSTEMS AND METHODS FOR ENHANCING OBJECTS IN X-RAY IMAGES

BACKGROUND

Medical images such as X-ray fluoroscopic images are widely used today to visualize internal human organs and/or implanted surgical devices. Because of limitations related to imaging speed and/or radiation dosage, however, medical images acquired using existing medical imaging technologies usually have low contrast and include noise, which affects the view of some structures depicted in the medical images (e.g., thin tubular structures such as blood vessels, catheters, guide wires, stents etc.).

SUMMARY

The present disclosure relates to techniques for enhancing object(s) in an X-ray image. According to embodiments of the present disclosure, an apparatus may receive a current image frame of an X-ray video, wherein the current image frame may include a first view of an object (e.g., a stent, a guide wire, a catheter, etc.). The apparatus may further detect, using a first machine learning (ML) model, the object in the current image frame, wherein the detection may be performed based on the current image frame, a sequence of image frames preceding the current image frame in the X-ray video, and data indicating respective locations, orientations, or deformations of the object in the sequence of image frames. The apparatus may determine, using a second machine learning (ML) model, a background image layer, wherein the determination may be performed based on the current image frame and one or more image frames from the sequence of image frames that precedes the current image frame in the X-ray video. Based on the background image layer, the current image frame, and the sequence of image frames that precedes the current image frame in the X-ray video, the apparatus may generate an output image that includes a second view of the object, wherein the second view may improve the first view of the object with respect to at least one of a noise level, an image clarity, or an image contrast associated with the object.

In embodiments of the present disclosure, the apparatus may generate the output image described herein by determining respective residual images for the current image frame and the sequence of image frames that precedes the current image frame by subtracting the background image layer from the current image frame and the sequence of image frames that precedes the current image frame, and averaging the respective residual images for the current image frame and the sequence of image frames that precedes the current image frame to generate the output image. In examples, the respective residual images for the current image frame and the sequence of image frames that precedes the current image frame may be registered by aligning the object in the current image frame with the object in the sequence of image frames that precedes the current image frame. In examples, detecting the object in the current image frame may comprise determining one or more of a location, an orientation, or a deformation of the object in the current image frame, wherein the object in the current image frame may be aligned with the object in the sequence of image frames that precedes the current image frame based on the respective locations, orientations, or deformations of the object in the current image frame and the sequence of image frames that precedes the current image frame.

In embodiments of the present disclosure, the one or more images used by the second machine learning model to determine the background image layer may correspond to a subset of the sequence of image frames that precedes the current image frame (e.g., the second ML model may only use 2-5 image frames for determining the background image layer). In embodiments of the present disclosure, the data that indicates the respective locations, orientations, or deformations of the object in the sequence of image frames that precedes the current image frame may include a first heatmap indicating the location of the object in one of the sequence of image frames that precedes the current image frame, and the apparatus may generate, using the first ML model, a second heatmap that indicates the location of the object in the current image frame based on the current image frame, the one of the sequence of image frames, and the first heatmap.

In embodiments of the present disclosure, the apparatus may detect one or more marker locations associated with the object in the current image frame and determine a location, an orientation, or a deformation of the object based on the one or more detected marker locations. In embodiments of the present disclosure, when the object does not have an apparent marker, the apparatus may determine a deformation field that indicates a displacement of the object from one of the sequence of image frames that precedes the current image frame to the current image frame, and further determine a location, an orientation, or a deformation of the object in the current image frame based on the deformation field and the location, orientation, or deformation of the object in the one of the sequence of image frames that precedes the current image frame. In examples, the deformation field may indicate the displacement of the object from one of the sequence of image frames to the current image frame by aligning the two image frames based on respective centroids of the object in the those image frames.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1A:
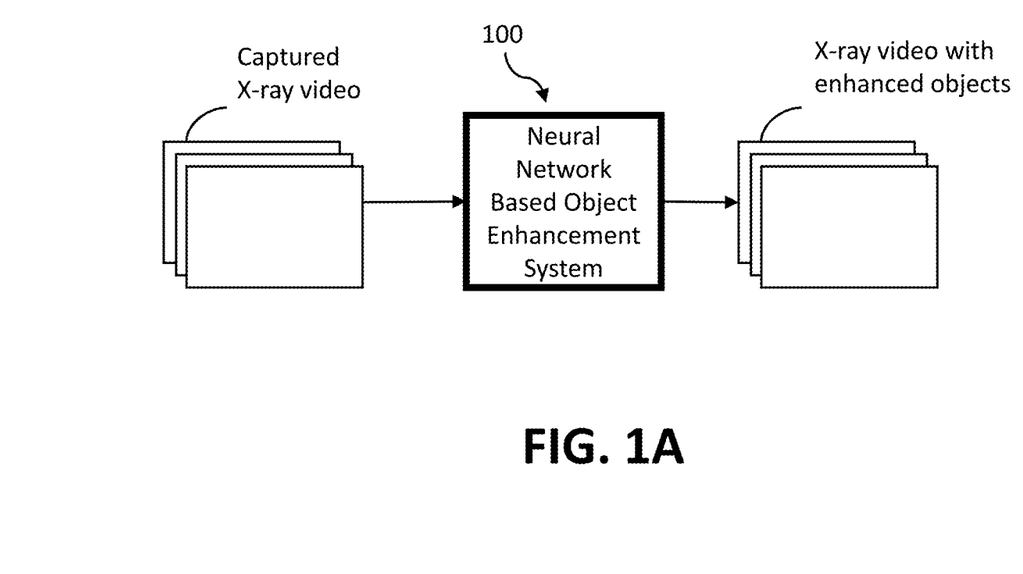
FIG. 1A is a diagram illustrating an example object enhancement system for enhancing one or more objects of interest in an X-ray video in accordance with some embodiments of the disclosure provided herein.

FIG. 1A is a diagram illustrating an example neural network (NN) based object enhancement system (e.g., an apparatus) 100 for enhancing one or more objects of interest in an X-ray video in accordance with some embodiments of the disclosure provided herein. The input to the object enhancement system 100 may include an X-ray video, which may be captured using an X-ray imaging device during a fluoroscopy procedure. For example, during the X-ray fluoroscopy procedure, an X-ray beam may be passed through a subject (e.g., a human body or an animal) and a continuous sequence of X-ray image frames may be formed and included in the X-ray video. The X-ray video may, for example, show the movement of a body part or a structure (e.g., thin tubular structures such as blood vessels, catheters, guide wires, stents etc.) over a time period.

Factors associated with the imaging hardware, environment, and/or subject of the fluoroscopy procedure may affect the quality of the X-ray images in the X-ray video. For example, stent visibility in the X-ray video (or visibility of other structures or body parts) may be limited because a low-level radiation dose is often used due to safety concerns. As another example, certain images of the X-ray video may become blurry due to movements or physiological cycles of the patient during the fluoroscopy procedure (e.g., a stent may move with the heartbeat and breathing of the patient). Accordingly, the object enhancement system 100 may be provided to enhance the view of one or more objects in the X-ray video. For example, the output of the object enhancement system 100 may include an X-ray video in which each image frame includes an enhanced view of the one or more objects. Examples of input and output of the object enhancement system 100 are shown in FIGS. 1B and 1C.

Figure 1B:
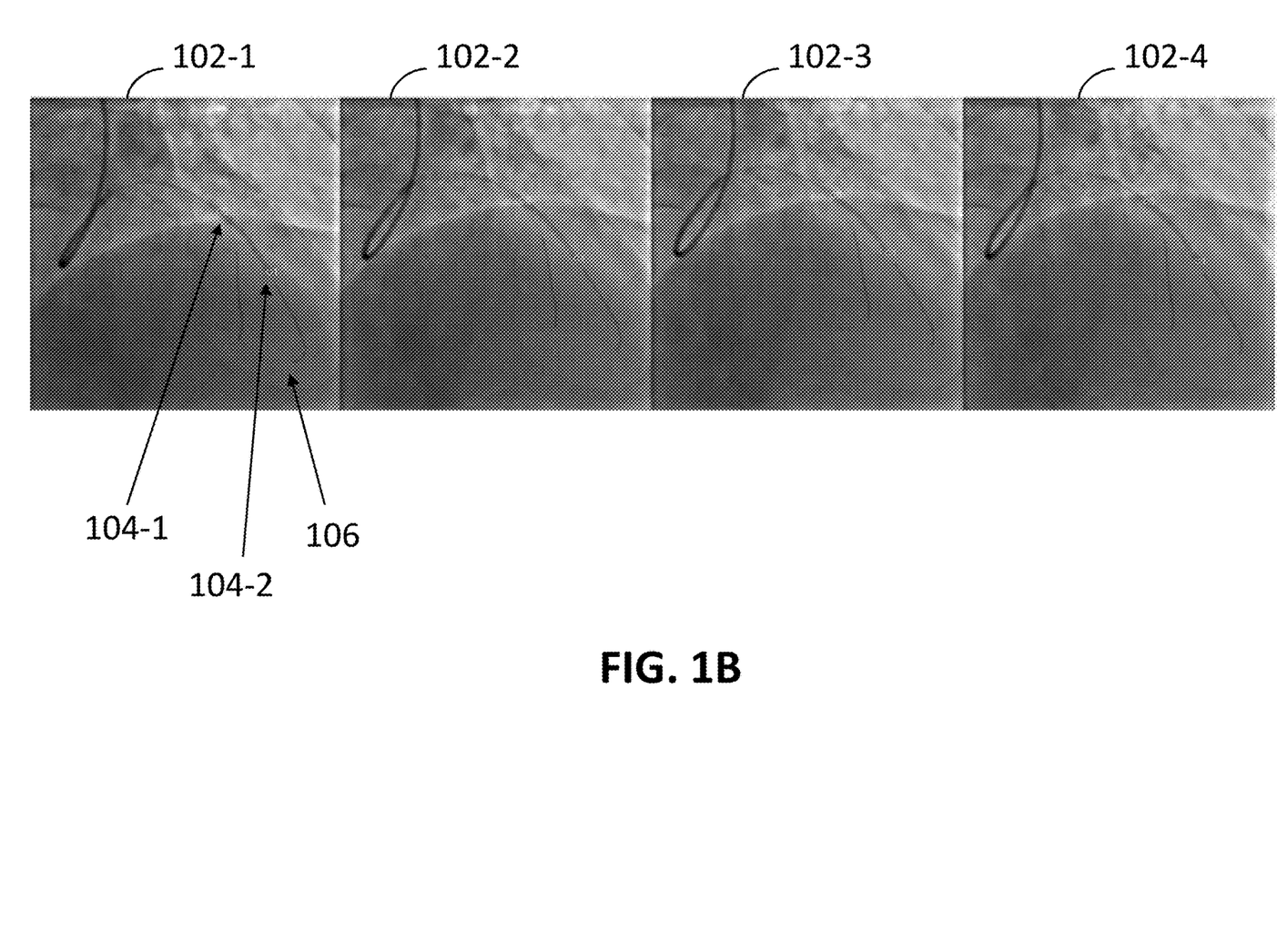
FIG. 1B illustrates multiple image frames in a sample X-ray video that contains a stent therein.
Figure 1C:
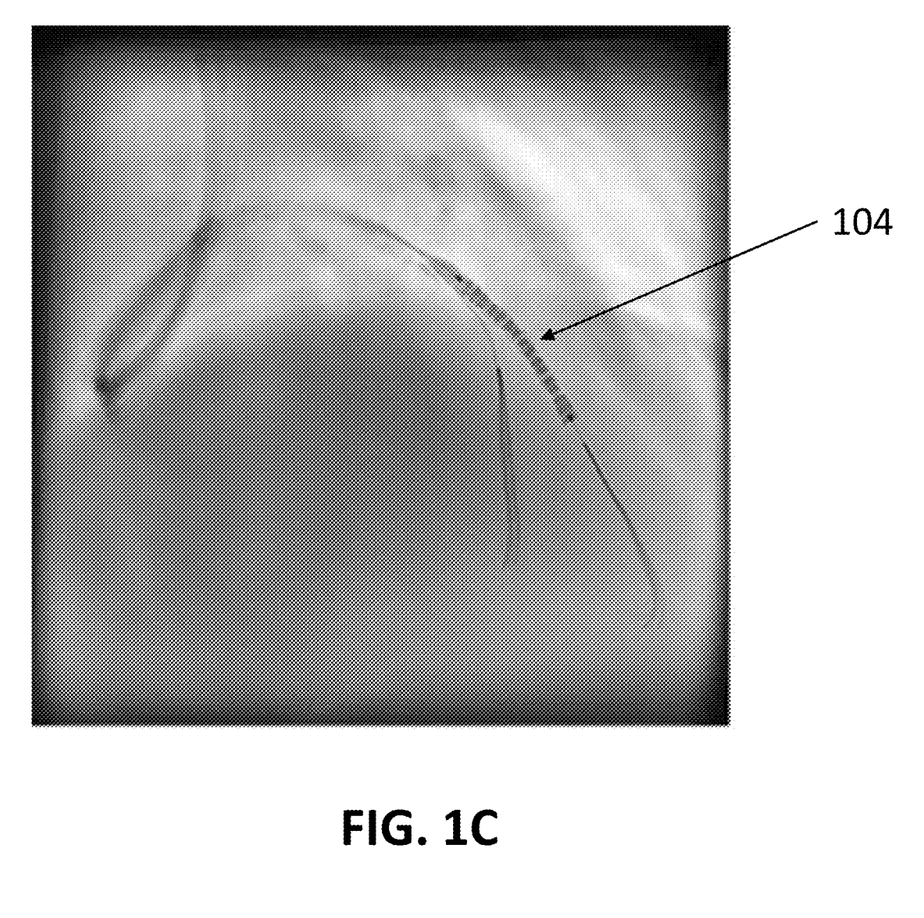
FIG. 1C illustrates an output image containing an enhanced view of the stent shown in FIG. 1B in accordance with some embodiments of the disclosure provided herein.

FIG. 1B illustrates multiple image frames, e.g., 102-1, 102-2, 102-3, 102-4, in a sample X-ray video. The image frames 102-1, . . . 102-4 (source medical images) may each depict an object of interest such as an anatomical structure of the human body and/or an artificial device that may be inserted into the human body. For instance, in some examples, the object of interest may include one or more tubular structures such as one or more blood vessels (e.g., coronary arteries), catheters, guide wires, stents, etc., and in other examples, the object of interest may include one or more non-tubular structures such as the left ventricle, the myocardium, etc. In the example of FIG. 1B, the object of interest may be a stent placed in a blood vessel, as shown between two stent markers 104-1 and 104-2.

With further reference to FIG. 1B, medical images 102-1 through 102-4 may each include a background 106 that may surround the object of interest (e.g., the stent) and exhibit a contrast with the object of interest. Due to limitations associated with imaging speed and/or radiation dosage, however, the contrast between the object of interest and the background 106 may not be as clear or distinguishable as desired and therefore various techniques may be used to enhance the object of interest in the image (e.g., with respect to a noise level, an image clarity, and/or an image contrast) such that structural details of the object of interest may be readily discernable to the human eyes. FIG. 1C illustrates an output image depicting an enhanced view of the stent 104 shown in FIG. 1B using the object enhancement system described herein (e.g., 100 in FIG. 1A). As shown in FIG. 1C, the view of the object of interest (e.g., the stent) is enhanced over the original images shown in FIG. 1B (e.g., with respect to one or more of a noise level, an image clarity or an image contrast) such that the structure details of the stent are more readily discernable to the human eyes.

Figure 2:
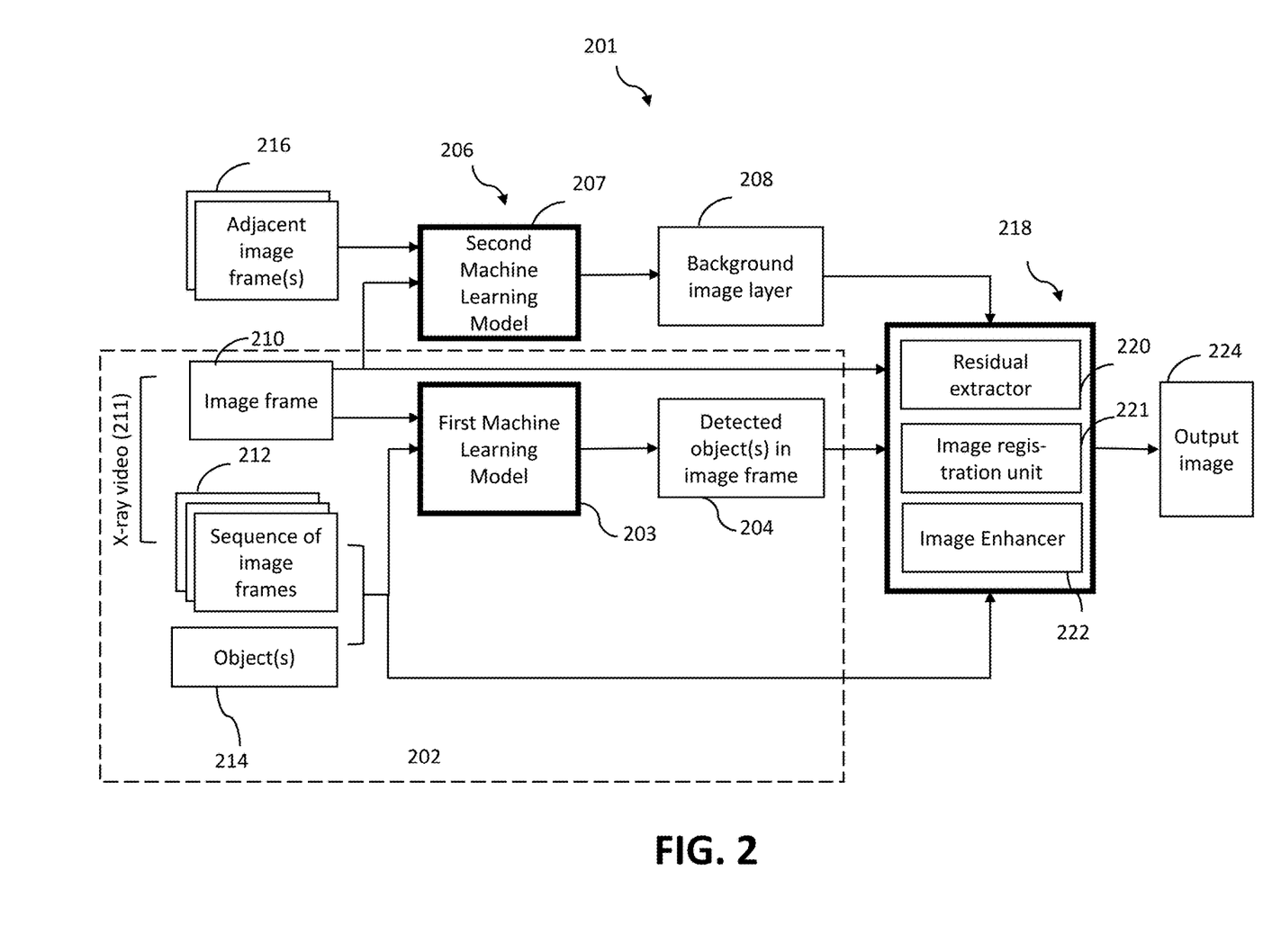
FIG. 2 is a diagram illustrating an example system for enhancing one or more objects of interest in an X-ray video in accordance with some embodiments of the disclosure provided herein.

FIG. 2 is a diagram illustrating an example system 201 for enhancing one or more objects of interest in an X-ray video in accordance with some embodiments of the disclosure provided herein. In these embodiments, system 201 may be configured to process a given image frame in an X-ray video. As shown, for a given image frame 210 in an X-ray video (211) containing one or more objects (e.g., stent in any of 102-1, 102-2, 102-3, 102-4 of FIG. 1B), system 201 may generate an output image 224 (e.g., an image shown in FIG. 1C) containing an enhanced view of the stent.

System 201 may include an object detection module 202. In some examples, the object detection module 202 may include a first machine learning model 203, which may be configured to process the image frame 210 and a sequence of image frames 212 that precedes the image frame 210 in the X-ray video 211. The first machine learning model 203 may be trained to detect one or more objects 204 in the image frame 210 based on the image frame 210, the sequence of image frames 212 that precedes the image frame 210 in the X-ray video 211, and location information of object(s) 214 (e.g., the same set of object(s) as objects 204) in the sequence of image frames 212. The details of the object detection module 202 are further described in FIG. 3.

The location information of object(s) 214 in the sequence of image frames 212 may indicate respective locations, orientations, and/or deformations of the object(s) 214 in the sequence of image frames 212. Such location information may be obtained by detecting object(s) 214 in the sequence of image frames 212 (e.g., using the object detection module 202) and the information may be stored in a memory for detecting objects 204 in image frame 210. Similarly, as a result of the object detection in image frame 210, respective locations, orientations, and/or deformations of the objects 204 in image frame 210 may also be determined and stored for use with subsequent image frames of the X-ray video 211. As will be described further below, the location information of the objects 204 and/or 214 may be provided to an image enhancement module 218 to generate the output image 224 comprising an enhanced view of the detected objects.

With further reference to FIG. 2, system 201 may include a background image generator 206. In some examples, the background image generator 206 may include a second machine learning model 207, which may be trained to detect a background image layer 208 based on the image frame 210 and one or more other image frames 216. As described herein, the background image layer may include a plurality of pixels represent the background of image frame 210 other than the object(s) of interest. Thus, when the background image layer is subtracted from image frame 110, the resulting image (residual image) may contain the object(s) of interest only.

In some examples, the one or more image frames 216 used in conjunction with image frame 210 to determine the background image layer may be from the sequence of image frames 212 that precedes the image frame in the X-ray video. For example, the one or more image frames 216 may be a subset of the sequence of image frames 212 (e.g., image frames 216 may include only 2 image frames), and such a small number of image frames may allow for speedy, real-time extraction of the background image layer. The accelerated background extraction may be made possible by the second machine learning model 207 (e.g., a U-Net neural network), which may be trained offline with data obtained from applying a conventional layer separation technique (e.g., such as recursive projected compressive sensing) to a long video (e.g., with more than 100 image frame) to obtain ground truth background layer images. The training of the second machine learning model 207 may include, for example, providing the second machine learning model 207 with an input image, forcing the model to predict a background, and adjusting the model parameters to minimize the difference between the predicted background and a ground truth background layer image obtained using the aforementioned layer separation technique.

As shown in FIG. 2, image enhancement module 218 may be configured to generate the output image 224 based on image frame 210 (e.g., a current image frame), the object(s) 204 detected in image frame 210, the background image layer 208, and the sequence of image frames 212 that precedes image frame 110 in the X-ray video, along with the object(s) 214 detected in the sequence of image frames 212. In non-limiting examples, the image enhancement module 218 may include a residual extractor 220 and an image enhancer 222. Residual image extractor 220 may be configured to subtract the background image layer 208 from each of the image frame 210 and the sequence of image frames 212 to determine a respective residual image thereof (e.g., the foreground of those images). Image enhancer 222 may be configured to combine (e.g., via averaging) the respective residual images for the image frame 210 and the sequence of image frames 212 to generate the output image 224.

In some examples, image enhancement system 218 may additionally include an image registration unit 221 configured to register the respective residual images for the image frame 210 and the sequence of image frames 212 in the X-ray video 211 before combining them using image enhancer 222. In non-limiting examples, image registration may be performed by aligning the objects of interest across image frame 210 and the sequence of image frames 212. For example, the objects of interest across the image frames may be aligned based on respective locations, orientations, and/or deformations of the objects in the image frames, the information of which may be obtained from the object detection module 202 and stored by the object detection system 201 in a memory area.

Figure 3:
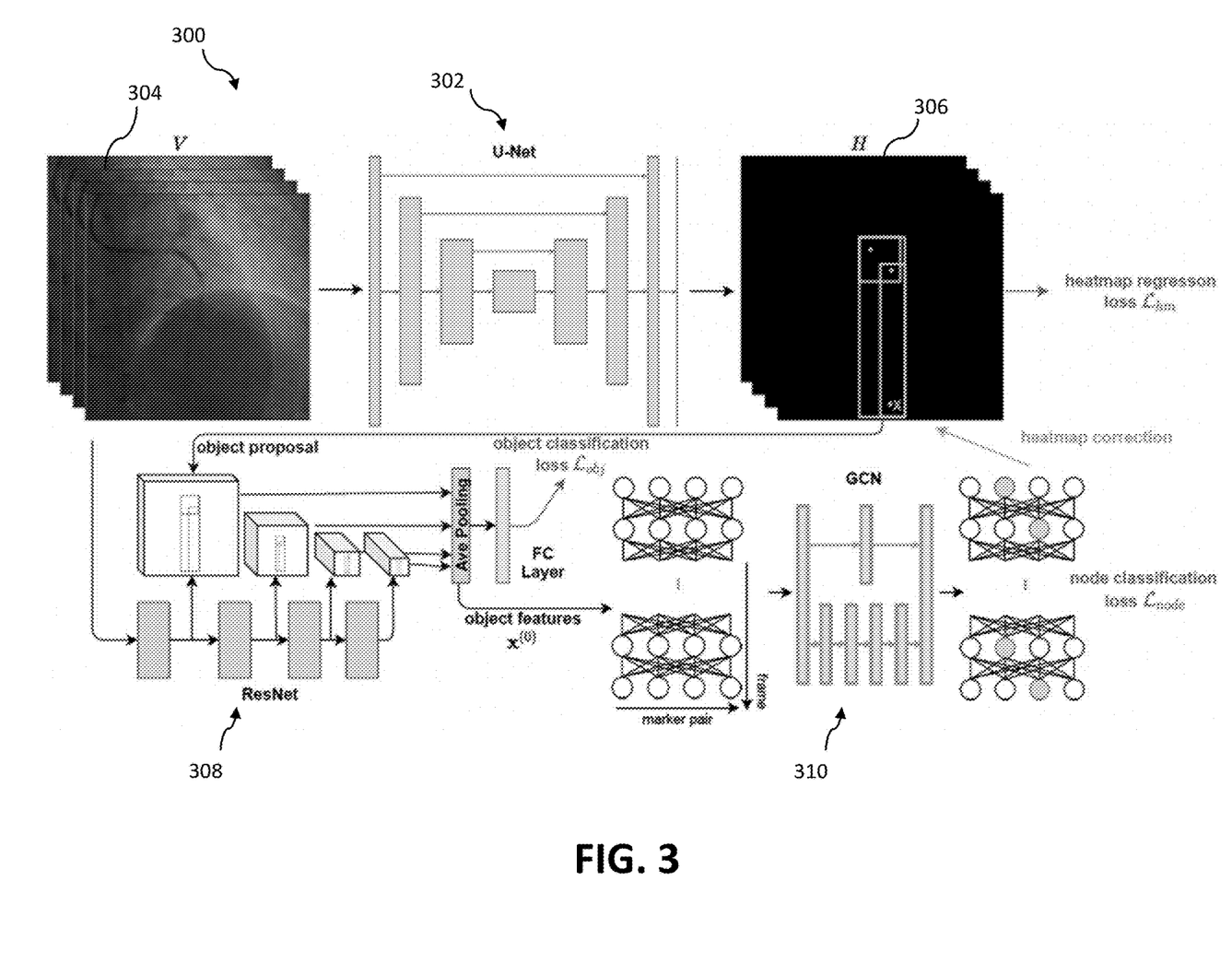
FIG. 3 is a diagram illustrating an example system for detecting and tracking one or more objects in multiple medical images in accordance with some embodiments of the disclosure provided herein.

FIG. 3 illustrates an example of a system 300 (e.g., the object detection system 202 of FIG. 2) for detecting and tracking one or more objects in one or more medical images (e.g., a medical video) in accordance with some embodiments of the disclosure provided herein. System 300 will be described herein using stent as an example of the object of interest. However, those skilled in the art will appreciate that the embodiments described with respect to FIG. 3 can be applied to any suitable object in any suitable medical image.

As shown in FIG. 3, system 300 may include a machine learning model 302 configured to detect object(s) in an X-ray video 304 and generate output data 306 indicating the detected object(s). In some examples, the machine learning model 302 may include a neural network such as a convolutional neural network (CNN) arranged in a U-Net architecture. Machine learning model 302 may be configured to detect one or more markers on an object of interest (e.g., stent balloon markers 104-1 and 104-2 of FIG. 1B). Thus, a candidate object determined using the machine learning model 302 may be represented by the detected markers (e.g., a landmark pair containing the two balloon markers of a stent). As shown in FIG. 3, the output of the machine learning model 302 may include a plurality of predicted heatmaps each containing the detected objects (e.g., markers) in a respective image frame. Thus, as the input video $V \in R^{T \times H \times W \times C}$ 304 is provided to the machine learning model 302, heatmaps $H \in R^{T \times H \times W}$ 306 may be generated, where peak points in each of the heatmaps may indicate the locations of candidate markers (e.g., represented as 2D coordinates).

In some examples, system 300 may further include one or more additional neural networks (e.g., 308, 310) to refine and/or track the objects detected by the neural network 304. For example, a residual neural network (ResNet) 308 may be used to extract features associated with candidate objects, each of which may be represented by a bounding box based on the detected marker(s) described above. The outputs of ResNet 308 at multiple levels within corresponding bounding boxes (of the same object) may be averaged and stored in a multi-dimension (e.g., D dimensions) feature vector $x^{(0)} \in R^D$ for each candidate object, and the feature vectors may be provided to a graph neural network (GNN) such as a graph convolutional neural network (GCN) 310 to determine the temporal relationship of the detected objects from frame to frame. For instance, via GCN 310, the temporal relationship of the detected objects in X-ray video 304 may be represented using a graph. The nodes of the graph may represent encoded features of candidate objects obtained from marker detection and the edges (e.g., connecting two nodes) of the graph may represent the temporal coherency of the candidate objects between frames. The GCN 310 may be trained as a node classification model to update both node and edge features via message passing and object tracking may be achieved by learning both context and temporal information through the training. For example, node classification using the GCN 310 may identify one or multiple tracked objects in different image frames as the positive nodes of a corresponding object class, whereas false positives of the detected objects and/or untracked objects may be classified as negative nodes.

In some examples, the GCN 310 may update the features of candidate objects in a frame based on similar objects from adjacent frames and a sequence of convolution layers may enable information propagation from frames that are further away. It is recognized that the feature update may be susceptible to noisy neighborhood (e.g., if a target object is missed during object detection in an upstream frame, such errors may propagate to nearby frames). Accordingly, the GCN 310 may include a parallel fully connected (FC) bypass, in which all of the node features may be updated independently without influence from other connected nodes. In some examples, the results of GCN 310 may be used to correct heatmaps 406 and thus refine the detected objects in the X-ray video 304.

One or more of the neural networks shown in FIG. 3 may be used as part of the object detection module 202 of FIG. 2. For example, once trained and deployed, the neural network 202 (e.g., a U-net) may receive, as inputs, a previous image frame and a current image frame from an X-ray video along with a heatmap indicating the marker locations of one or more objects of interest in the previous image frame, and output a heatmap that indicates the marker locations of the one or more objects of interest in the current image frame. Such an output may then be stored for use to detect the one or more objects in subsequent image frames of the X-ray video.

In some examples, data indicating a detected object in an image may include a respective location, orientation, and/or deformation of the object, which may be determined based on the marker locations described herein. In some examples, a detected object (e.g., such as a catheter or a guide wire) may not have apparent markers and the object detection system described herein may be configured to determine respective centroids of the object in multiple image frames and a deformation field that indicates a displacement (e.g., pixelwise displacement) of the object from one image frame to another when the images are aligned based on the respective centroids of the object in those images. The centroid detection may be performed using a neural network trained with annotated data, while the deformation field prediction may be performed using a neural network trained in an unsupervised or self-supervised manner (e.g., by minimizing a difference between an image depicting a deformed object obtained using the deformation field and an actual reference image that depicts the deformed object).

Figure 4:
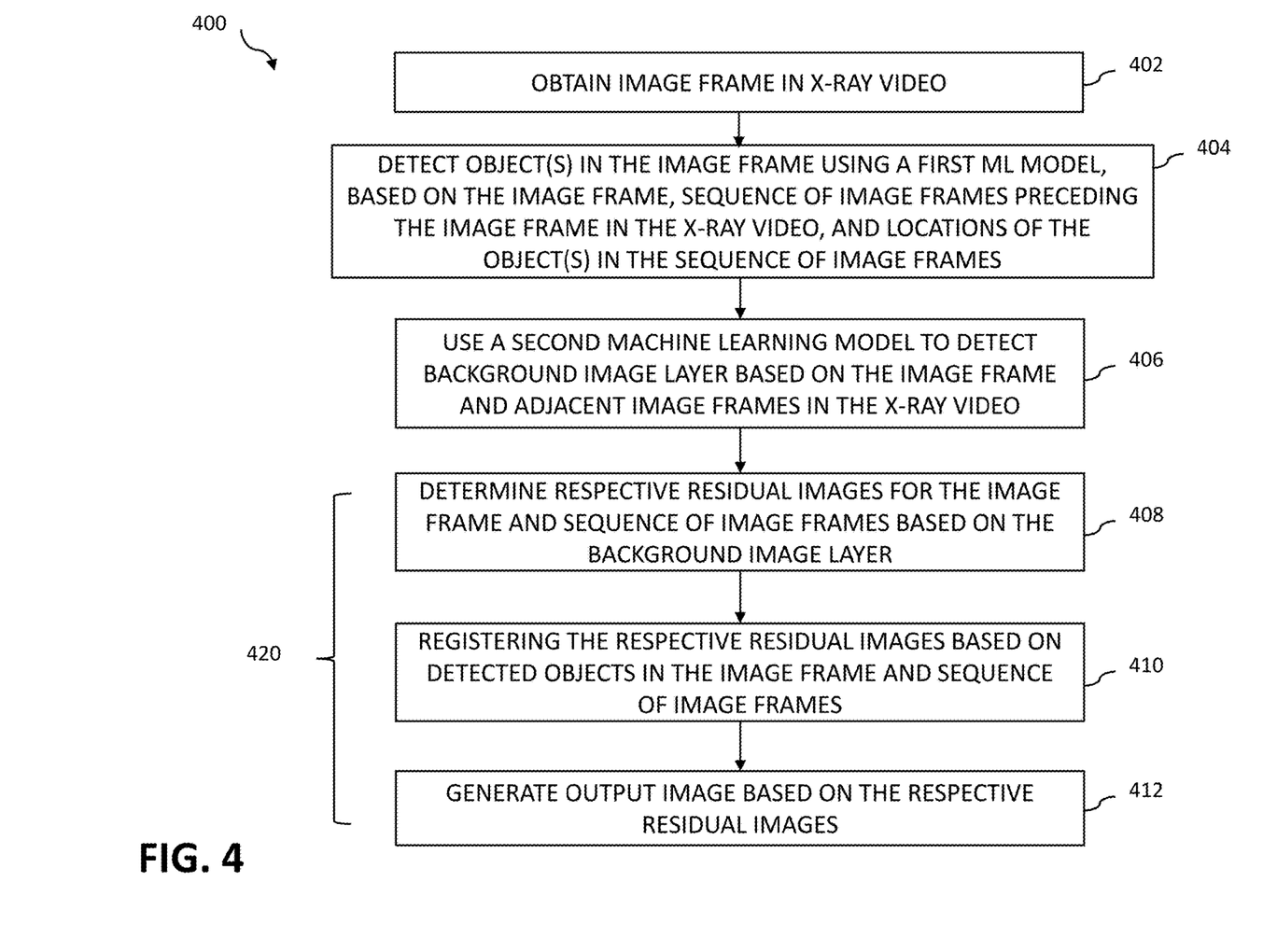
FIG. 4 is a flow diagram of an example process for enhancing one or more objects of interest in an X-ray video in accordance with some embodiments of the disclosure provided herein.

FIG. 4 is a flow diagram of an example method 400 for enhancing one or more objects of interest in a medical image of an X-ray video. Method 400 may be implemented in system 201 of FIG. 2 and may start with obtaining a current image frame in an X-ray video at 402. Method 400 may further include detecting, at 404, one or more objects in the current image frame using a first machine learning model (e.g., 203 of FIG. 2), based on the current image frame, a sequence of image frames that precede the current image frame in the X-ray video, and data indicating the locations of the one or more objects in the sequence of image frames. Additionally, method 400 may also include detecting a background image layer at 406 using a second machine learning model (e.g., 207 of FIG. 2), based on the current image frame and one or more other image frames of the X-ray video.

Method 400 may further include generating an output image comprising an enhanced view of the detected objects at 420. As shown in FIG. 4, the generation of the output image at 420 may include determining, at 408, respective residual images associated with the current image frame and the sequence of image frames that precedes the current image frame based on the background image layer, registering the respective residual images based on the detected objects in the image frame and the sequence of image frames at 410, and generating the output image based on the residual images at 412 (e.g., by averaging the residual images). The operation at 408 may be implemented in object extractor 220 of FIG. 2, operation 410 may be implemented in image registration unit 221 of FIG. 2, and operation 412 may be implemented in image enhancer 222 of FIG. 2.

Figure 5:
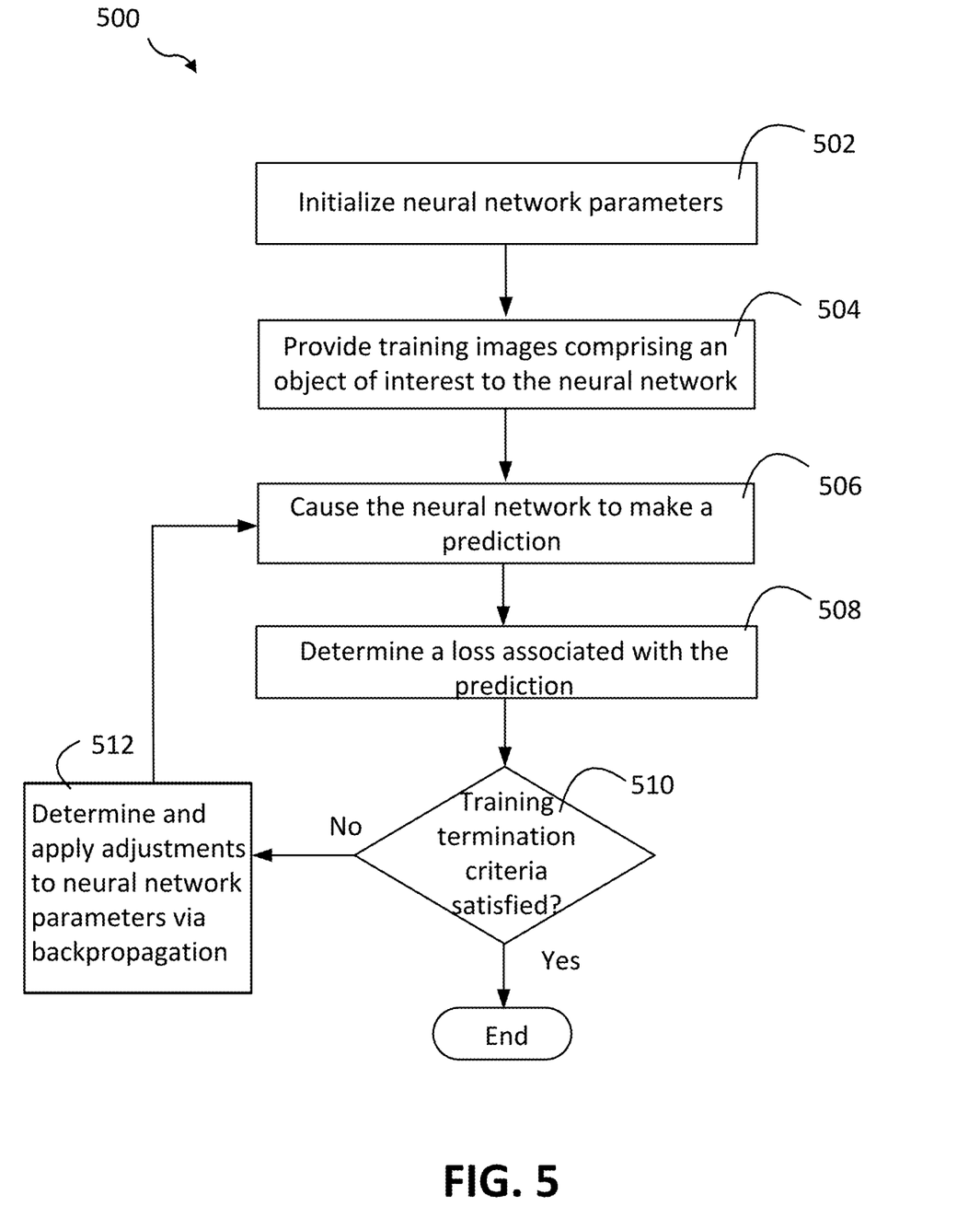
FIG. 5 is a flow diagram of an example process for training a machine learning model to perform one or more of the tasks described herein.

FIG. 5 illustrates operations in an example process 500 that may be associated with training a neural network (e.g., the first machine learning model 203 or the second machine learning model 207 in FIG. 2) to perform one or more of tasks described herein. As shown, the training operations may include initializing the parameters of the neural network (e.g., weights associated with the various filters or kernels of the neural network) at 502. The parameters may be initialized, for example, based on samples collected from one or more probability distributions or parameter values of another neural network having a similar architecture. The training operations may further include providing training data (e.g., medical images comprising an object of interest) to the neural network at 504, and causing the neural network to make a prediction (e.g., about the location of the object of interest in the medical images or a background image layer of the medical images) at 506. At 508, a loss between the predicted result and a desired result may be determined. The desired result may be, for example, a human annotated image or a ground truth heatmap if the training is supervised, or an unannotated reference image (e.g., a target image in the case of determining a deformation field as described herein) if the training is unsupervised or self-supervised.

The loss determined at 508 may be evaluated at 510 to determine whether one or more training termination criteria have been satisfied. For instance, a training termination criterion may be deemed satisfied if the loss(es) described above is below a predetermined threshold, if a change in the loss(es) between two training iterations (e.g., between consecutive training iterations) falls below a predetermined threshold, etc. If the determination at 510 is that the training termination criterion has been satisfied, the training may end. Otherwise, the loss may be backpropagated (e.g., based on a gradient descent associated with the loss) through the neural network at 512 before the training returns to 506.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 6:
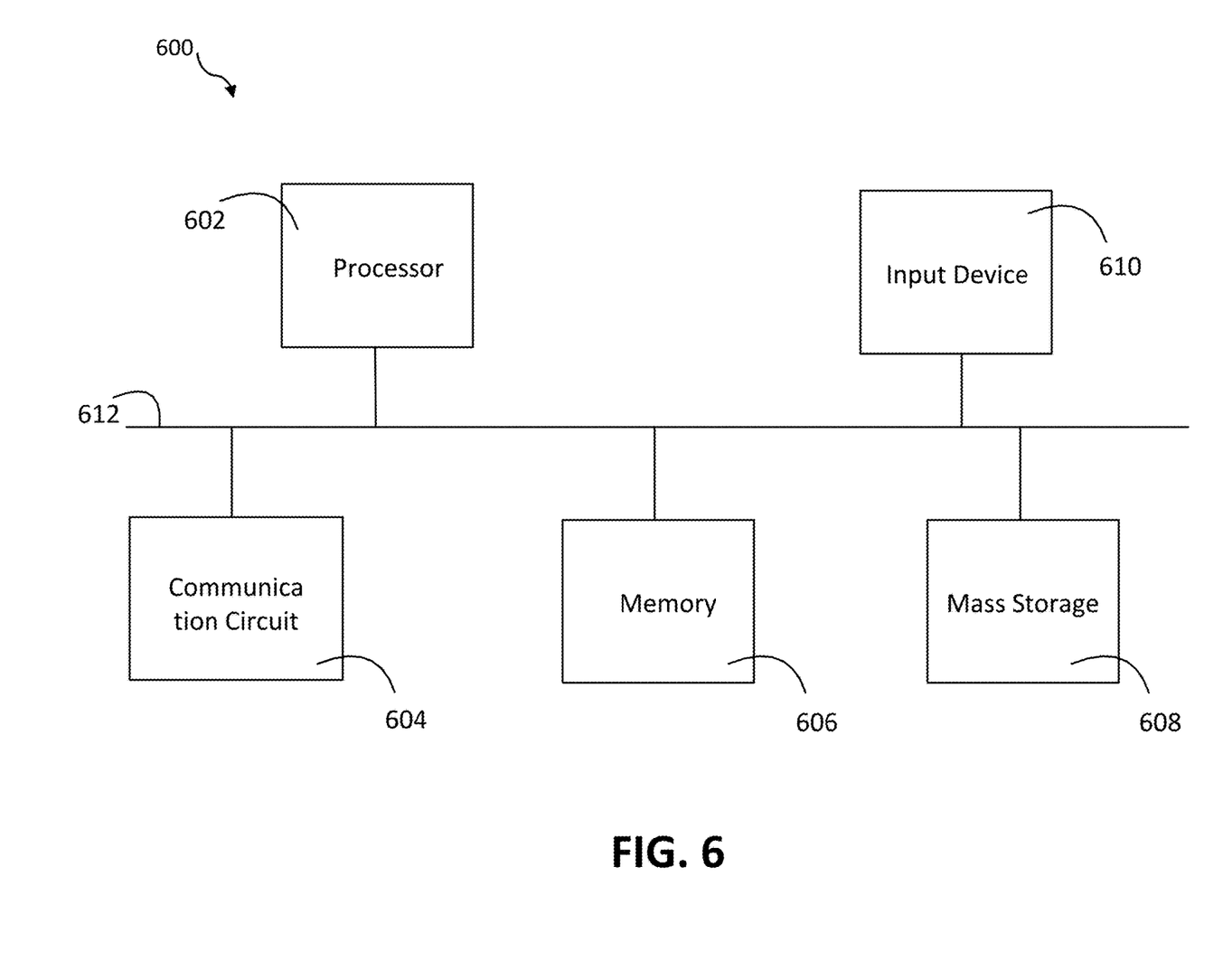
FIG. 6 is a block diagram illustrating example components of an apparatus that may be configured to perform the object enhancement tasks described herein.

The systems, methods, and/or instrumentalities described herein may be implemented using one or more processors, one or more storage devices, and/or other suitable accessory devices such as display devices, communication devices, input/output devices, etc. FIG. 6 is a block diagram illustrating an example apparatus 600 that may be configured to perform the image enhancement tasks described herein. As shown, apparatus 600 may include a processor (e.g., one or more processors) 602, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 600 may further include a communication circuit 604, a memory 606, a mass storage device 608, an input device 610, and/or a communication link 612 (e.g., a communication bus) over which the one or more components shown in the figure may exchange information.

Communication circuit 604 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 602 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 608 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 602. Input device 610 may include a keyboard, a mouse, a voice-controlled input device, a touch sensitive input device (e.g., a touch screen), and/or the like for receiving user inputs to apparatus 600.

It should be noted that apparatus 600 may operate as a standalone device or may be connected (e.g., networked, or clustered) with other computation devices to perform the functions described herein. And even though only one instance of each component is shown in FIG. 6, a skilled person in the art will understand that apparatus 600 may include multiple instances of one or more of the components shown in the figure.

Various embodiments described herein provide advantages over conventional medical imaging systems in that one or more target structures in a medical image, e.g., X-ray fluoroscopic image, can be detected and an enhanced view of the target structures can be generated. This results in improved usability of the medical image. Further, various machine learning models are used to improve the accuracy of the object detection and tracking, and real-time processing can also be achieved.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and variations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising one or more processors configured to:
   receive a current image frame of an X-ray video, wherein the current image frame includes a first view of an object;
   detect, using a first machine learning model, the object in the current image frame, wherein the detection is performed based on the current image frame, a sequence of image frames preceding the current image frame in the X-ray video, and data indicating respective locations, orientations, or deformations of the object in the sequence of image frames;
   determine, using a second machine learning model, a background image layer, wherein the determination is performed based on the current image frame and one or more image frames from the sequence of image frames that precedes the current image frame in the X-ray video; and
   generate an output image based on the background image layer, the current image frame, and the sequence of image frames that precedes the current image frame in the X-ray video, wherein the output image includes a second view of the object that improves the first view of the object with respect to at least one of a noise level, an image clarity, or an image contrast associated with the object.

2. The apparatus of claim 1, wherein the one or more processors being configured to generate the output image comprises the one or more processors being configured to:
   determine respective residual images for the current image frame and the sequence of image frames that precedes the current image frame by subtracting the background image layer from the current image frame and the sequence of image frames that precedes the current image frame; and
   average the respective residual images for the current image frame and the sequence of image frames that precedes the current image frame to generate the output image.

3. The apparatus of claim 2, wherein the one or more processors being configured to generate the output image further comprises the one or more processors being configured to register the respective residual images for the current image frame and the sequence of image frames that precedes the current image frame by aligning the object in the current image frame with the object in the sequence of image frames that precedes the current image frame.

4. The apparatus of claim 3, wherein the one or more processors being configured to detect the object in the current image frame comprises the one or more processors being configured to determine one or more of a location, an orientation, or a deformation of the object in the current image frame, and wherein the object in the current image frame is aligned with the object in the sequence of image frames that precedes the current image frame based on the respective locations, orientations, or deformations of the object in the current image frame and the sequence of image frames that precedes the current image frame.

5. The apparatus of claim 1, wherein the object detected in the current image frame comprises a stent, a guide wire, or a catheter.

6. The apparatus of claim 1, wherein the one or more image frames used by the second machine learning model to determine the background image layer correspond to a subset of the sequence of image frames that precedes the current image frame.

7. The apparatus of claim 1, wherein the data that indicates the respective locations, orientations, or deformations of the object in the sequence of image frames that precedes the current image frame comprises a first heatmap indicating the location of the object in one of the sequence of image frames, and wherein the one or more processors being configured to detect the object in the current image frame using the first machine learning model comprises the one or more processors being configured to generate, using the first machine learning model, a second heatmap that indicates the location of the object in the current image frame based on the current image frame, the one of the sequence of image frames, and the first heatmap.

8. The apparatus of claim 1, wherein the one or more processors being configured to detect the object in the current image frame comprises the one or more processors being configured to:
   detect one or more marker locations associated with the object in the current image frame; and
   determine a location, an orientation, or a deformation of the object based on the one or more detected marker locations.

9. The apparatus of claim 1, wherein the one or more processors being configured to detect the object in the current image frame comprises the one or more processors being configured to determine a deformation field that indicates a displacement of the object from one of the sequence of image frames that precedes the current image frame to the current image frame and determine a location, an orientation, or a deformation of the object in the current image frame based on the deformation field and the data that indicates the location, orientation, or deformation of the object in the one of the sequence of image frames that precedes the current image frame.

10. The apparatus of claim 9, wherein the one or more processors being configured to detect the object in the current image frame comprises the one or more processors being configured to determine a centroid of the object in the current image frame, wherein the data that indicates the location, orientation, or deformation of the object in the one of the sequence of image frames indicates a centroid of the object in the one of the sequence of image frames, and wherein the deformation field indicates the displacement of the object from the one of the sequence of image frames to the current image frame when the one of the sequence of image frames and the current image frame are aligned based on the respective centroids of the object in the one of the sequence of image frames and the current image frame.

11. A method for enhancing objects in an X-ray video, the method comprising:
receiving a current image frame of the X-ray video, wherein the current image frame includes a first view of an object;
detecting, using a first machine learning model, the object in the current image frame, wherein the detection is performed based on the current image frame, a sequence of image frames preceding the current image frame in the X-ray video, and data indicating respective locations, orientations, or deformations of the object in the sequence of image frames;
determining, using a second machine learning model, a background image layer, wherein the determination is performed based on the current image frame and one or more image frames from the sequence of image frames that precedes the current image frame in the X-ray video; and
generating an output image based on the background image layer, the current image frame, and the sequence of image frames that precedes the current image frame in the X-ray video, wherein the output image includes a second view of the object that improves the first view of the object with respect to at least one of a noise level, a clarity, or a contrast associated with the object.

12. The method of claim 11, wherein generating the output image comprises:
determining respective residual images for the current image frame and the sequence of image frames that precedes the current image frame by subtracting the background image layer from the current image frame and the sequence of image frames that precedes the current image frame; and
averaging the respective residual images for the current image frame and the sequence of image frames that precedes the current image frame to generate the output image.

13. The method of claim 12, wherein generating the output image further comprises registering the respective residual images for the current image frame and the sequence of image frames that precedes the current image frame by aligning the object in the current image frame with the object in the sequence of image frames that precedes the current image frame.

14. The method of claim 13, wherein detecting the object in the current image frame comprises determining one or more of a location, an orientation, or a deformation of the object in the current image frame, and wherein the object in the current image frame is aligned with the object in the sequence of image frames that precedes the current image frame based on the respective locations, orientations, or deformations of the object in the current image frame and the sequence of image frames that precedes the current image frame.

15. The method of claim 11, wherein the object detected in the current image frame comprises a stent, a guide wire, or a catheter.

16. The method of claim 11, wherein the data that indicates the respective locations, orientations, or deformations of the object in the sequence of image frames that precedes the current image frame comprises a first heatmap indicating the location of the object in one of the sequence of image frames, and wherein detecting the object in the current image frame using the first machine learning model comprises generating, using the first machine learning model, a second heatmap that indicates the location of the object in the current image frame based on the current image frame, the one of the sequence of image frames, and the first heatmap.

17. The method of claim 11, wherein detecting the object in the current image frame comprises:
detecting one or more marker locations associated with the object in the current image frame; and
determining a location, an orientation, or a deformation of the object based on the one or more detected marker locations.

18. The method of claim 11, wherein detecting the object in the current image frame comprises determining a deformation field that indicates a displacement of the object from one of the sequence of image frames that precedes the current image frame to the current image frame, and determining a location, an orientation, or a deformation of the object in the current image frame based on the deformation field and the data that indicates the location, orientation, or deformation of the object in the one of the sequence of image frames that precedes the current image frame.

19. The method of claim 18, wherein detecting the object in the current image frame comprises determining a centroid of the object in the current image frame, wherein the data that indicates the location, orientation, or deformation of the object in the one of the sequence of image frames indicates a centroid of the object in the one of the sequence of image frames, and wherein the deformation field indicates the displacement of the object from the one of the sequence of image frames to the current image frame when the one of the sequence of image frames and the current image frame are aligned based on the respective centroids of the object in the one of the sequence of image frames and the current image frame.

20. A non-transitory computer readable medium comprising program instructions that, when executed by one or more processors, cause the one or more processors to perform a method for enhancing objects in an X-ray video, the method comprising:
receiving a current image frame of the X-ray video, wherein the current image frame includes a first view of an object;

detecting, using a first machine learning model, the object in the current image frame, wherein the detection is performed based on the current image frame, a sequence of image frames preceding the current image frame in the X-ray video, and data indicating respective locations, orientations, or deformations of the object in the sequence of image frames;

determining, using a second machine learning model, a background image layer, wherein the determination is performed based on the current image frame and one or more image frames from the sequence of image frames that precedes the current image frame in the X-ray video; and generating an output image based on the background image layer, the current image frame, and the sequence of image frames that precedes the current image frame in the X-ray video, wherein the output image includes a second view of the object that improves the first view of the object with respect to at least one of a noise level, an image clarity, or an image contrast associated with the object.

* * * * *